United States Patent [19]

Irwin et al.

[11] 3,914,590

[45] Oct. 21, 1975

[54] SERIAL TWO'S COMPLEMENTER

[75] Inventors: John M. Irwin, Clay; Noble R. Powell, Syracuse, both of N.Y.

[73] Assignee: General Electric Company, Syracuse, N.Y.

[22] Filed: Nov. 4, 1974

[21] Appl. No.: 520,542

[52] U.S. Cl. .................................. 235/164; 307/207

[51] Int. Cl.²...................... G06F 5/02; H03K 13/25

[58] Field of Search ............ 235/164; 307/207, 213; 340/347 DD

[56] References Cited

UNITED STATES PATENTS 2,941,719 6/1960 Gloess et al. ........................ 235/164

*Primary Examiner*—R. Stephen Dildine, Jr.

*Attorney, Agent, or Firm*—Richard V. Lang; Carl W. Baker; Frank L. Neuhauser

[57] ABSTRACT

The present invention relates to a serial two's complementer whose logical design, by the preferential use of NAND devices and other measures, provides a minimum geometry configuration, in an implementation using metal oxide semiconductor field effect transistors with large scale integration. The two's complement function is achieved by a binary storage element implemented by an inverter, two NAND gates with two half bit dynamic delays and by an exclusive NOR gate implemented by a NAND gate and a composite NAND-OR configuration. The binary storage element and exclusive NOR gate are interconnected to invert the serial bit stream after the occurrence of the first one to produce the two's complement.

8 Claims, 4 Drawing Figures

| FET TRANSISTORS | TRANSCONDUCTANCE ($g_m$) @ $V_{DS}$ = 1 VOLT |
|---|---|
| 1,3,4,7,10,12,13,14 16,17 & 19 | 60μmho |
| 2,5,8,11,15,18 & 22 | 3μmho |
| 6 & 9 | 12μmho |
| 20 & 21 | 120μmho |

SERIAL TWO'S COMPLEMENTER

BACKGROUND OF THE INVENTION:

1. Field of the Invention

The present invention relates to the field of digital computation and more particularly to sequential logic used to form a two's complement of a number typically for effecting a sign change. The invention relates to logic particularly adapted to large scale integration.

2. Description of the Prior Art

The properties of the two's complement of a binary number are well known. Several algorithms are known for serially forming the complement of a binary number in which the least significant bit occurs first in time, and the word terminates with a sign bit as the most significant bit.

The large scale integration in MOS technology of certain logic functions is treated in a book entitled "MOS Integrated Circuits," edited by William M. Penney and Lillian Lau, Van Nostrand Reinhold Company, New York 1972.

The logic by which many algorithms have been implemented is not well suited for large scale integration. Many applications also require an enabling control and variable word length capability with contiguous arrangement of data words.

SUMMARY OF THE INVENTION

Accordingly, it is an object of the present invention to provide an improved serial two's complementer.

It is another object of the present invention to provide an improved serial two's complementer of minimum geometry when fabricated in large scale integration.

It is a further object of the present invention to provide an improved serial two's complementer having a minimum geometry when implemented using metal oxide semiconductor field effect transistor devices.

These and other objects of the invention are achieved in a novel combination for serially forming the two's complement of a binary number of variable word length with the least significant bit first in time. The invention comprises a binary storage element having set and reset input connections and a complementary output connection. Means are provided to reset the binary storage element by the time of the least significant bit for each word in the serial bit stream and the set input connection is coupled to the apparatus input terminal. The binary storage element responds to the first "one" in the input bit stream and produces a change in output after a one bit delay. An exclusive NOR is also provided having two input connections and an output connection. One input connection is coupled to the apparatus input terminal and the other to the complementary output of the binary storage element. The output connection from the exclusive NOR is coupled to the apparatus output terminal. The exclusive NOR inverts the input bit stream when the complementary output of the binary storage element goes to the zero state. The two's complement of the serial input number appears at the apparatus output terminal.

In accordance with an aspect of the invention the binary storage element comprises an inverter, a first NAND gate having two inputs and an output, a dynamic one bit time delay, and a second NAND gate having two or three inputs and an output. The inverter is coupled between the apparatus input terminal and one input of the first NAND gate and the output of the first NAND gate is coupled through the delay to one input of the second NAND gate. The other input of the second NAND gate provides a reset input. The output of the second NAND gate is coupled back to the other input of the first NAND gate and to the input of the exclusive NOR gate.

In addition, the exclusive NOR gate comprises a third NAND gate, a fourth NAND gate, and an OR gate, each having two inputs and an output. One input connection of the third NAND gate and the OR gate are connected to the output of the binary storage element. Another input of the third NAND gate and the OR gate are connected to the apparatus input terminal. The output connections of the third NAND gate and the OR gate are connected to the respective inputs of the fourth NAND gate. The output of the fourth NAND gate is connected to the apparatus output terminal.

In accordance with another aspect of the invention, the second NAND gate is provided with an input for the reset function which resets the gate just prior to the least significant bit in the input bit stream. It may also be provided with an input for the control function which enables or disables the two's complement function of the apparatus.

The two's complementer is preferably carried out with MOSFET (metal oxide semiconductor field effect transistor) technology and fabricated in large scale integrated form.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings, in which:

DESCRIPTION OF A PREFERRED EMBODIMENT

Figures 1, 2, 3, 4:
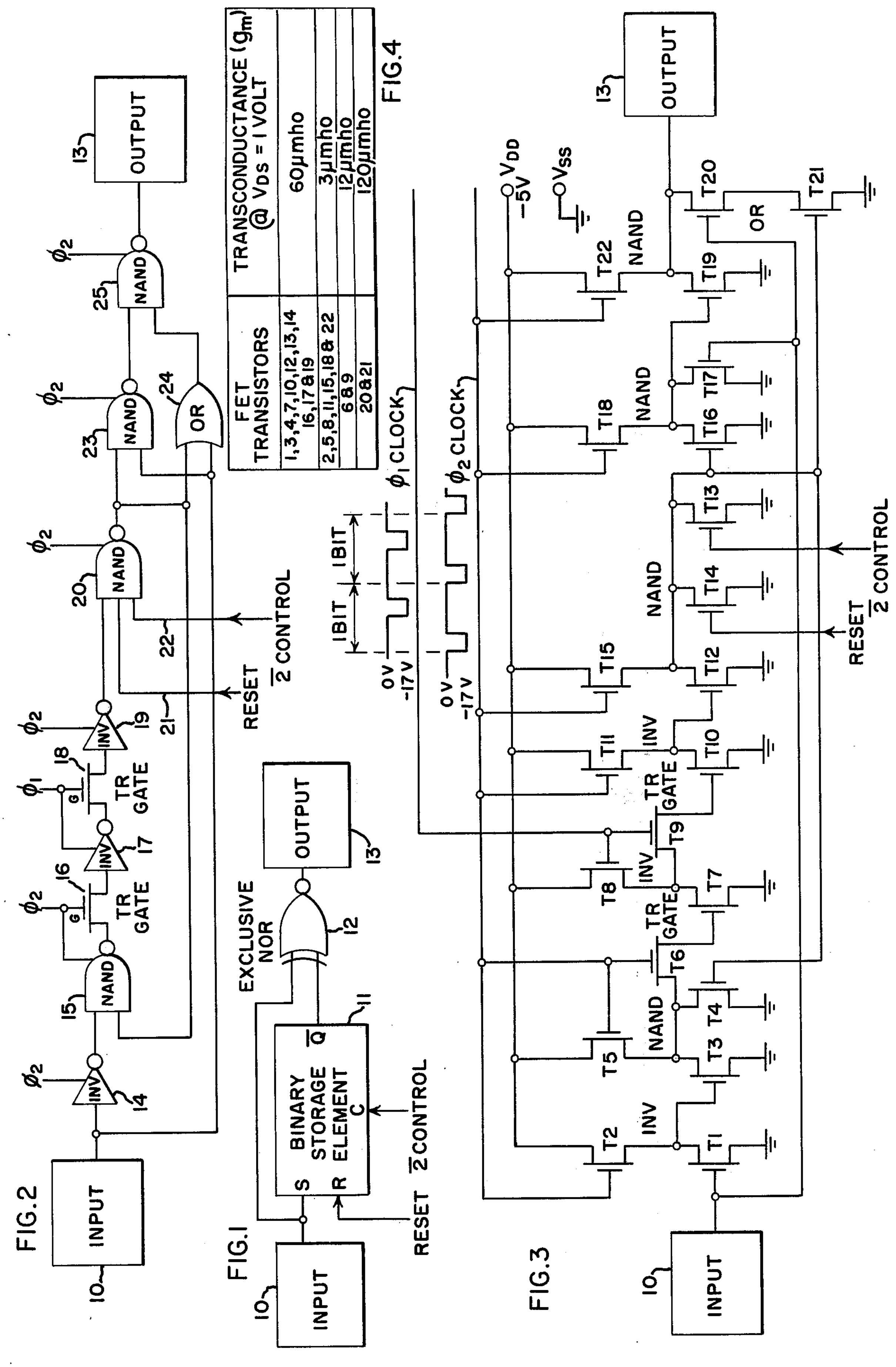
FIG. 1 is a block diagram in simplest form of a serial two's complementer in accordance with the invention.
FIG. 2 is a logic diagram of the serial two's complementer.
FIG. 3 is a circuit diagram of a serial two's complementer employing metal oxide semiconductor field effect transistors and suitable for fabrication in large scale integrated circuit format.
FIG. 4 is a chart of the transconductances of the field effect transistors used in the circuit diagram of FIG. 3.

A serial two's complementer in accordance with the invention is shown in the simple block diagram of FIG. 1. Its two principal parts are a binary storage element 11 and an exclusive NOR gate 12. The binary storage element has set and reset input connections, a control input and a complementary output connection. The exclusive NOR gate 12 is provided with a pair of input connections and a single output connection. Input signals from a source 10 are applied to the set terminal of the binary storage element and to one input of the exclusive NOR gate 12. The complementary output of the binary storage element 11 is applied to the other input of the exclusive NOR gate 12. The output of the exclusive NOR gate is coupled to the output 13. The two's complement of the number applied to the input 10 appears at the output 13.

The two's complement of a binary number is of interest when it is desired to effect a sign change such as for subtraction. In such usage, the number is available in binary form, with the bits arranged in order from the least significant bit to the most significant bit, with a sign bit being defined as the most significant bit, and the word length may be variable. In the case of subtracting, the two's complement of the subtrahend may be formed and then substituted for the number and added to the minuend. This will have the effect in the computed result of subtraction.

The apparatus blocked out in FIG. 1 is designed to form the two's complement of a digital number of variable word length, with the least significant bit first in time followed by successively more significant bits and having a sign bit as the most significant bit. When such a number is available at the input 10, it will be applied to the set terminal of the binary storage element 11 and to one input terminal of the exclusive NOR 12. If the initial bit is "0", no change in state occurs in the binary storage element 11, and a 0 appears at the output of the exclusive NOR 12. If the second bit is also a 0, no change in state occurs. If the third bit is a "1", a change in state occurs in the binary storage element at the end of the bit time, and at the end of the bit time, the complementary $\overline{Q}$ output provides a 0. The third bit is passed unchanged as a 1 at the output of the exclusive NOR. If a fourth bit is 0, the binary storage element remains at 0, and the exclusive NOR now changes the input bit from a 0 to a 1. From the fourth bit on, the exclusive NOR inverts the input bit stream until the binary storage element is reset.

The foregoing operation of the binary storage element may be summarized by the following sequential table:

| Input Bit Stream | BSE State at $T_N$ | BSE State at $T_N$+1 |
|---|---|---|
| 0 | 0 | 0 |
| 0 | 1 | 1 |
| 1 | 0 | 1 |
| 1 | 1 | 1 |

The operation of the exclusive NOR may be summarized in the following truth table:

| Input Bit Stream | BSE | Exclusive NOR |
|---|---|---|
| 0 | 0 | 1 |
| 0 | 1 | 0 |
| 1 | 0 | 0 |
| 1 | 1 | 1 |

The serial two's complementer whose block diagram is illustrated in FIG. 1 may be advantageously carried out in metal oxide semiconductor technology using several preferences in the functional logical elements, such as the preferential use of NAND gates. The diagram of FIG. 2 more fully describes such an embodiment in conventional logical elements.

Referring to FIG. 2, the two's complementer comprises an inverter 14, a NAND gate 15, a transmission gate 16, an inverter 17, a transmission gate 18, an inverter 19, and a NAND gate 20. All together, these elements perform the function of the binary storage element 11 of FIG. 1. The two's complementer is completed with the NAND gate 23, the OR gate 24 and the NAND gate 25, which perform the function of the exclusive NOR gate 12 of FIG. 1.

The elements 14 – 20 constituting the binary storage element 11 are interconnected in the following manner. The input 10 is applied to the input terminal of the inverter 14 whose output terminal is coupled to one of the two inputs of the NAND gate 15. The output of the NAND gate 15 is applied to the input of a field effect transistor acting as a transmission gate 16. The output of the "FET" 16 is coupled to the input of the inverter 17. The inverter 14, NAND gate 15, and the gate (g) of the FET transmission gate 16 are clocked in synchronism with the bit stream by connection to the "$\phi_2$" clock bus. The output of the inverter 17 is coupled to the input of a second FET transmission gate 18. The output of the second FET is connected to the input of the inverter 19. The inverter 17 and the transmission gate 18 are clocked at an approximately ½bit delay with respect to the bit stream by connection to the $\phi_2$ clock bus. The output of the inverter 19 is then coupled to one of the three inputs of the NAND gate 20. The inverter 19 and the NAND gate 20 are both clocked by connection to the $\phi_2$ clock bus. The other two inputs of the NAND gate 20 form respectively the points for resetting the binary storage element and for application of the two complement control. The output of the NAND gate 20 is then fed back to the other input of the NAND gate 15. The output function of the binary storage element 11 of FIG. 1 appears at the output of the NAND gate 20.

The binary storage element 11 of FIG. 1 functions in the following manner. The input bit stream from 10 is applied to the inverter 14, which inverts the bit stream, and applies the inverted bit streamm to the NAND gate 15. The NAND gate 15 (by definition) functions in accordance with the following truth table:

| Inv. Bit Stream | NAND (20) Output | NAND (15) Output |
|---|---|---|
| 0 | 0 | 1 |
| 0 | 1 | 1 |
| 1 | 0 | 1 |
| 1 | 1 | 0 |

The succeeding transmission gate 16, inverter 17, transmission gate 18, and inverter 19 successively transfer the bit from the output of the NAND gate 15 to the input of the NAND gate 20 through two inversions and two half bit delays.

The output bit stream from 10 then appears at the input of the NAND gate 20 delayed one bit, and having gone through four inversions, is uninverted.

The NAND gate 20 responds to the reset and control functions in addition to the delayed bit stream by a truth table like that of NAND gate 15. Assuming that 1's are on the reset and control inputs, an inverted bit from the bit stream, delayed one bit, will appear at the output of the NAND gate 20. Assuming that the initial bit is a 0, the NAND 20 output will produce a 1 and the 1 will be fed back to the NAND gate 15 as assumed previously. If a second 0 bit occurs, the same output at NAND gate 20 will occur. If the third bit from the bit stream is a 1 then the NAND gate 15 inverts as before (producing a zero) and the NAND gate 20 after a one bit delay, will have three one inputs, causing its output to switch to a 0, which is fed back to the NAND gate 15. When the next bit comes along, the NAND gate 15 is unaffected by the signal on the bit and remains in the 1 state. The 1 is applied after a one bit delay to the input of the NAND gate 20, which produces a 0 holding for each succeeding bit, irrespective of the bit. Thus, the 0 output condition on the NAND gate 20 is held by this regenerative connection throughout the balance of the word, or until the reset, or two's complement control changes to a 0 condition.

The elements 23, 24 and 25 of FIG. 2 constituting the exclusive NOR gate 12 of FIG. 1 are interconnected in the following manner. The NAND gate 23, OR gate 24, NAND gate 25, each have two inputs and a single output. The input bit stream from 10 is applied to one input of the NAND gate 23 and to one input of the OR gate 24. The output of the NAND gate 20 is applied to the other input of the NAND gate 23 and to the other input of the OR gate 24. The two inputs of the NAND gate 25 are taken respectively from the output of the NAND gate 23 and the output of the OR gate 24. The output of the NAND gate 25 is the two's complement of the input bit stream and is applied to the output 13 of the two's complementer.

The performance of the exclusive NOR function by the gates 23, 24, 25 follows by consolidating their respective truth tables.

The exclusive NOR function is by definition:

| Bit Stream | NAND (20) Output | Exclusive NOR (12) Output |
|---|---|---|
| 0 | 0 | 1 |
| 0 | 1 | 0 |
| 1 | 0 | 0 |
| 1 | 1 | 1 |

The truth table for the NAND gates 23 and 25 are similar to that for the NAND gate 15 previously given. The truth table for the OR gate 24 is as follows:

| Bit Stream | NAND (20) Output | OR (24) Output |
|---|---|---|
| 0 | 0 | 0 |
| 0 | 1 | 1 |
| 1 | 0 | 1 |
| 1 | 1 | 1 |

The truth tables of the respective elements 23, 24 and 25 may be consolidated to explain the operation of the exclusive NOR (12):

| Bit Stream | NAND (20) Output | NAND (23) Output | OR (24) Output | NAND (25) Output |
|---|---|---|---|---|
| 0 | 0 | 1 | 0 | 1 |
| 1 | 0 | 1 | 1 | 0 |
| 0 | 1 | 1 | 1 | 0 |
| 1 | 1 | 0 | 1 | 1 |

In short, when the NAND gate (20) is in a 0 state, the bit stream is inverted, while when it is in a 1 state, the bit stream is uninverted by virtue of the exclusive NOR action.

The composite operation of the logic diagram of FIG. 2 is to provide a controlled two's complement of a number. The logic diagram of FIG. 2 employs NAND gates throughout except for the single OR gate 24. The logic diagram is particularly advantageous in MOS technology being of "minimum" geometry. The function may be carried out using an area of $1.60 \times 10^{-4}$ inches$^2$, ($1 \times 10^{-3}$ cm$^2$) on a silicon chip.

The circuit implementation of the logic diagram of FIG. 2 is shown in FIG. 3. The circuit diagram illustrates the simple implementation of the foregoing logic diagram in providing the two's complement function. The elements in the diagram are field effect transistors of the metal oxide semiconductor variety. Suitable transconductances for the transistors are illustrated in the chart of FIG. 4. The circuit functions are carried out as follows: The transistor pair T1, T2 form the first inverter 14; the transistor pair T7, T8 form the inverter 17; and the transistor pair T10, T11 form the third inverter 19. The transistors T3, T4, T5 form the NAND gate 15; the transistors T12, T13, T14 and T15 form the NAND gate 20. The transistors T6 and T9 form the transmission gates 16 and 18, respectively. The foregoing perform the function of the binary storage element 12 of FIG. 1. The transistors T16, T17, T18 form the NAND gate 23 and the transistors T19, T20, T21 and T22 together form the OR gate 24 and the NAND gate 25. The transistors (T2, T5, T8, T11, T15, T18 and T22), acting as load devices for the respective inverters and NAND gates, are of only 3 micromhos. The transistors performing the active role in the NAND function and in the inverters are of a standard 60 micromho transconductance. On the other hand, the OR gate 24 which requires serially connected transistors (i.e. T20, T21) requires that when they are both on, they exhibit a joint transconductance of 60 micromhos. Thus, T20 and T21 are required to be of twice the transconductance (120 micromhos) of the other transistors. Since an increased transconductance requires an increased area, the area requirement of the OR gate, neglecting the small areas required for the load devices, is approximately twice that of the corresponding NAND gate. In the present configuration, an economy is effected since the NAND and OR functions are combined in the four devices T19, T20, T21, T22 and one load device and one active device are aliminated. Thus, the transistor T22 jointly acts as the load for the NAND function and for the OR function. The transistors T20 and T21 jointly act as the active part of the OR function and as one branch of the active part of the NAND function.

The input requires a 0 during the least significant bit time to return the binary storage element to its 1 complementary output state, and a continuous 1 waveform during the remainder of the word time. The two's complement control requirement is of a similar nature in that a continuous 1 enabling signal is required throughout the period when complementing is desired and a continuous 0 disabling signal is required throughout the period when complementing is not desired. The change in control signal must occur at word boundaries. In both the case of the reset and of the control signal, time advance is not needed since these signals are applied directly to the NAND output gates T14 and T15 as shown in FIG. 3.

The logic diagram of FIG. 2 is implemented in the very simple and effective fashion illustrated in FIG. 3. In addition to using a minimum of chip area (by preferential use of NAND gates and certain other simplifications), the MOS structures used are simple and reliable.

They include well known gates, inverters and dynamic storage configurations.

The circuit does not have excessive propagation delays, allowing the chips to be used with high clock rates. The control and reset functions allow the bit stream to continue without disturbing the contiguity of the data words.

What we claim as new and desire to secure by Letters Patent of the United States is:

1. Apparatus for serially forming the two's complement of a binary number of variable word length, with the least significant bit first in time, and having a sign bit as the most significant bit, comprising:
   a. an apparatus input terminal to which the serial binary number is applied,
   b. an apparatus output terminal from which the two's complement is derived,
   c. a binary storage element having set and reset input connections and a complementary output connection,
      said set input connection being coupled to said apparatus input terminal, said reset input connection being coupled to reset means to reset said binary storage element during the time of the least significant bit for each word,
      said binary storage element responding to a 1 set signal, and being clocked to produce a change in output after a one bit delay,
   d. an exclusive NOR gate having two input connections and an output connection,
      one input connection being coupled to said apparatus input terminal, the other input connection being coupled to the complementary output of said binary storage element; and the output connection being coupled to said apparatus output terminal,
      said exclusive NOR gate inverting the bit stream at the apparatus input terminal when the complementary output of the binary storage element goes to the zero state in response to a 1 in a serial binary number and producing a two's complement of said number at the apparatus output terminal.

2. Apparatus as set forth in claim 1 wherein said exclusive NOR gate comprises:
   a. a first NAND gate, a second NAND gate, and an OR gate, each having two inputs and an output,
   b. one input connection of said first NAND gate and said OR gate being connected to the output of said binary storage element, another input of said first NAND gate and of said OR gate being connected to said apparatus input terminal, output connections of said first NAND gate and said OR gate being connected to the respective inputs of said second NAND gate and the output of said second NAND gate being connected to said apparatus output terminal.

3. Apparatus as set forth in claim 1 wherein said binary storage element comprises:
   a. an inverter, a first NAND gate having two inputs and an output, a dynamic one bit time delay, and a second NAND gate having two inputs and an output,
   b. said inverter being coupled between said apparatus input terminal and one input of said first NAND gate, the output of said first NAND gate being coupled through said time delay to one input of said second NAND gate, the other input of said second NAND gate providing said reset input, and the output of said second NAND gate being coupled back to the other input of said first NAND gate and to the input of said exclusive NOR gate.

4. Apparatus as set forth in claim 1 wherein an input is provided to hold the binary storage element at the zero state or release the binary storage element for controlling the two's complementing process.

5. Apparatus as set forth in claim 4 wherein said binary storage element comprises:
   a. an inverter, a first NAND gate having two inputs and an output, a dynamic one bit time delay, and a second NAND gate having three inputs and an output,
   b. said inverter being coupled between said apparatus input terminal and one input of said first NAND gate, the output of said first NAND gate being coupled through said time delay to one input of said second NAND gate, a second input of said second NAND gate providing said reset input, and the third input of said second NAND gate providing said control input, and the output of said second NAND gate being coupled back to the other input of said first NAND gate and to the input of said exclusive NOR gate.

6. Apparatus as set forth in claim 5 wherein said exclusive NOR gate comprises:
   a. a third NAND gate, a fourth NAND gate, and an OR gate, each having two inputs and an output,
   b. one input connection of said third NAND gate and said OR gate being connected to the output of said binary storage element, another input of said third NAND gate and of said OR gate being connected to said apparatus input terminal, output connections of said third NAND gate and said OR gate being connected to the respective inputs of said fourth NAND gate and the output of said fourth NAND gate being connected to said apparatus output terminal.

7. Apparatus as set forth in claim 6 fabricated as a large scale integrated circuit.

8. Apparatus as set forth in claim 6 fabricated using metal oxide semiconductor field effect transistors (MOSFET) as the active devices as a large scale integrated circuit.

* * * * *